June 30, 1942. C. R. CARNEY 2,287,973
ICE TRAY
Filed Dec. 7, 1940 2 Sheets-Sheet 2

INVENTOR
Clifford R. Carney
BY
ATTORNEYS.

Patented June 30, 1942

2,287,973

UNITED STATES PATENT OFFICE 2,287,973

ICE TRAY

Clifford R. Carney, Dearborn, Mich.

Application December 7, 1940, Serial No. 369,037

12 Claims. (Cl. 62—108.5)

This invention relates to ice trays and more particularly to a novel and improved grid member which may be positioned in a pan to divide the space within the pan to form a plurality of ice blocks of convenient size for domestic use, and wherein the grid member may be readily actuated to release ice blocks from the grid and pan members.

An object of the invention is to provide an ice tray grid having a plurality of oppositely directed separator members interconnected by improved motion transmitting means whereby the separator members may be moved relative to each other simultaneously to release the ice blocks.

A further object of the invention resides in the provision of an ice tray grid having a single longitudinal separator member provided with a plurality of spaced substantially vertically disposed slots adapted to receive a plurality of vertically disposed transverse separator members which may be moved angularly about a substantially vertical axis to release ice.

Another object is to provide novel motion transmitting means between a longitudinal separator member and a longitudinally movable bar whereby the separator member may be moved angularly to release ice.

Yet a still further object is to provide motion transmitting means between a plurality of vertically disposed transverse members and a longitudinal separator member whereby the transverse members may be moved angularly about a substantially vertical axis to release ice.

Another object is to provide an ice tray grid which may be economically fabricated to divide the space within a pan into a plurality of ice block spaces of convenient size and wherein the grid members may be moved relative to each other to effect the release of ice.

Yet a further object resides in the provision of improved motion transmitting means between a longitudinal separator member and a longitudinally movable bar whereby the separator member and bar may be moved in opposite directions to release ice.

Still another object resides in the provision of interlocked separator members which may be actuated about horizontal and vertical axes to release ice.

A more detailed object is to provide a grid member having a longitudinal separator member movable about a horizontal axis from a substantially vertical position towards an angular position to release ice.

A further object resides in the provision of a grid member having a plurality of spaced vertically disposed transversely extending separator members movable about a substantially vertical axis to release ice.

Another object is to provide a grid member having interlocked longitudinal and transversely extending separator members provided with means to move said members about horizontal and vertical axes respectively to break the bond between frozen material and the walls of the grid and pan members.

Other objects and advantages of this invention will be apparent from the following detailed description considered in connection with the accompanying drawings, submitted for purposes of illustration only, and not intended to define the scope of the invention, reference being had for that purpose to the subjoined claims.

In the drawings wherein similar reference characters refer to similar parts throughout the several views:

Fig. 1 is a perspective view partly in section of an ice tray grid embodying the present invention.

Fig. 2 is a longitudinal sectional view taken substantially on the line 2—2 of Fig. 1, looking in the direction of the arrows.

Fig. 3 is a transverse sectional view taken substantially on the line 3—3 of Fig. 1, looking in the direction of the arrows.

Fig. 4 is a perspective view of the component parts of the grid structure shown in separated relationship.

Figure 5:
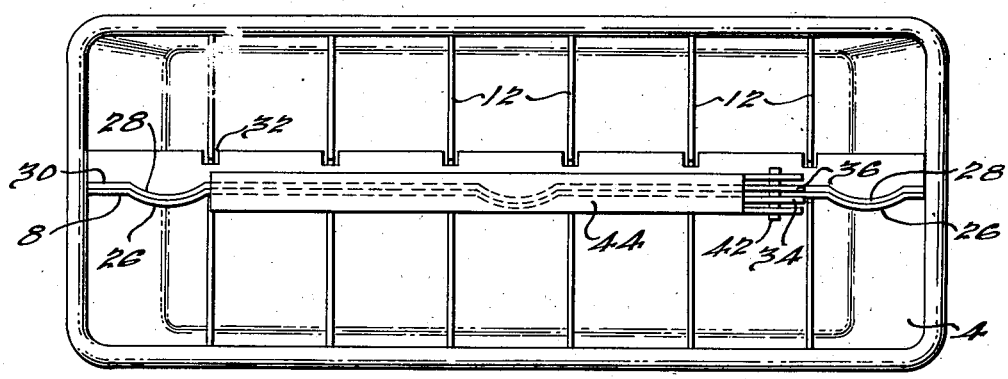
Fig. 5 is a plan view of an ice grid and pan mechanism showing the grid structure in the freezing or inoperative position.
Figure 6:
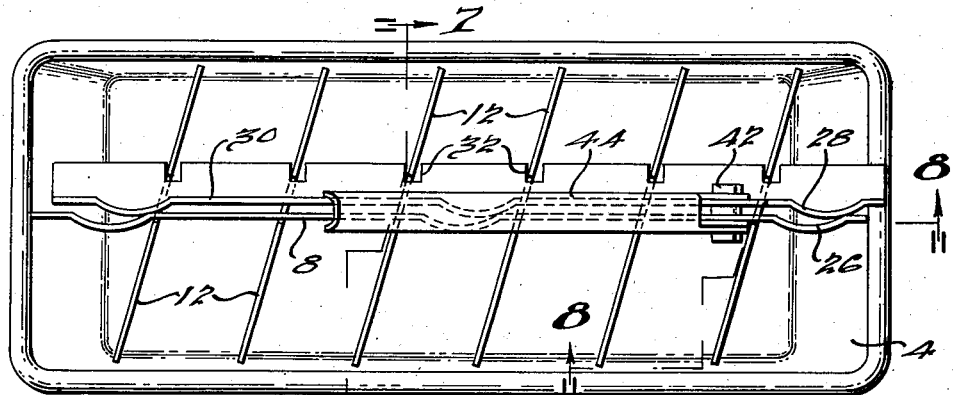
Fig. 6 is a view similar to Fig. 5 showing the grid in the operated or ice releasing position.
Figures 7, 8:
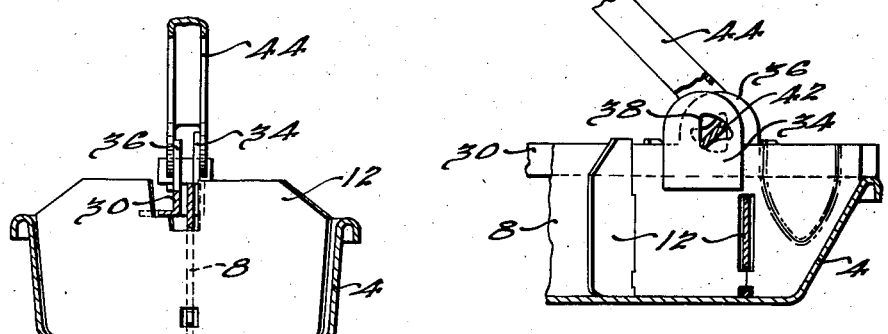
Fig. 7 is a transverse sectional view taken substantially on the line 7—7 of Fig. 6, looking in the direction of the arrows.
Fig. 8 is a longitudinal sectional view taken substantially on the line 8—8 of Fig. 6, looking in the direction of the arrows.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not separator member movable angularly about a horizontal axis and having a plurality of spaced substantially vertically extending slots, a plurality of transversely extending separator members mounted on the longitudinal member and projecting through said slots, a longitudinally movable bar associated with the longitudinal separator member and engaging the transverse separator members, and means to move said bar longitudinally relative to the longitudinal separator member to move each transverse separator member about vertical axes and to move the longitudinal separator about a horizontal axis to release ice.

2. An ice tray grid comprising a plurality of vertically disposed transversely extending separator members having compound notches formed adjacent their upper edges, a longitudinal separator member mounted on the transverse separator members and movable angularly about a substantially horizontal axis in said compound notches between a pair of spaced wall members of each compound notch, a longitudinally movable bar engaging the transverse and longitudinal members, and motion transmitting means to move the bar relative to the longitudinal separator member to actuate the transverse members and to move the longitudinal separator member about said substantially horizontal axis to release ice.

3. An ice tray grid comprising a longitudinal separator member movable from a substantially vertical position towards an angularly inclined position and having spaced cam surfaces formed in its upper edge, a plurality of transversely extending separator members movably mounted on the longitudinal separator member for movement about substantially vertically extending axes intermediate their length, means to move the transverse and longitudinal separator members comprising a longitudinally movable member having cam surfaces engaging the cam surfaces of the longitudinal separator member and motion transmitting means engaging the transverse members, and means to move said member longitudinally relative to the longitudinal separator member.

4. An ice tray grid comprising a plurality of vertically disposed transversely extending grid members, a longitudinally extending grid member mounted on the transverse members, and means associated with the longitudinal and transverse members whereby the longitudinal separator member may be moved from a substantially vertical position toward an angular position and each transverse member may be rotated about a substantially vertical axis intermediate its length to release ice.

5. An ice tray grid comprising a plurality of generally vertically disposed transversely extending separator members movable about substantially vertical axes intermediate their length, a longitudinal separator member having spaced camming portions mounted on the transverse members and movable about a horizontal axis from a substantially vertical position towards an angular position, a longitudinally movable bar associated with the longitudinal and transverse separator members, and means to move said bar longitudinally relative to the longitudinal separator member to move the longitudinal separator from said substantially vertical position towards an angular position and to move the transverse separator members about said substantially vertical axes to release ice.

6. An ice tray grid comprising a longitudinal separator member having a plurality of spaced substantially vertically extending slots, a plurality of transversely extending separator members mounted on the longitudinal member and projecting through said slots in such a manner that the longitudinal separator member may move angularly about a substantially horizontal axis, a longitudinally movable bar associated with the longitudinal separator member and engaging the transverse separator members, and means to move said bar longitudinally relative to the longitudinal separator member to move each transverse separator member about a vertical axis and to move the longitudinal separator member angularly about said horizontal axis to release ice.

7. An ice tray grid comprising a plurality of vertically disposed transversely extending separator members having compound notches formed adjacent their upper edges, a longitudinal separator member mounted on the transverse separator members and movable in said compound notches between a pair of spaced wall members of each compound notch from a substantially vertical position towards an angularly inclined position, a longitudinally movable bar engaging the longitudinal and transverse members, and motion transmitting means to move the bar relative to the longitudinal separator member to actuate the longitudinal separator member about a horizontal axis from said substantially vertical position towards an angular position and to actuate each transverse member about a substantially vertical axis to release ice.

8. An ice tray grid comprising a plurality of substantially vertically disposed transversely extending separator members, a longitudinal separator member having spaced camming portions mounted on the transverse members and movable thereon from a substantially vertical position to an angularly inclined position, a longitudinally movable bar associated with the longitudinal and transverse separator members, manually operable means to move the bar, and means comprising spaced cam members formed in the bar cooperating with the camming portions of the longitudinal separator member and spaced notched portions formed in the bar and engaging the transverse members whereby movement of the bar moves each transverse member angularly about a substantially vertical axis intermediate its length and moves the longitudinal separator member from a substantially vertical toward an angular position to release ice.

9. An ice tray grid comprising a plurality of transversely extending separator members having apertures formed adjacent their lower edges and compound slots having three or more spaced wall portions formed adjacent their upper edges, a longitudinal separator member having a plurality of spaced substantially vertically disposed slots for the reception of the transverse members movable about a substantially horizontal axis from a substantially vertical position towards an angularly inclined position, a movable bar positioned in portions of said compounds slots and having notched portions interlocking with one of said wall portions of each compound slot formed adjacent the upper edges of the transverse separator members, and manually operable means to move said bar relative to the longitudinal separator member to move the longitudinal separator member angularly from said substantially vertical position to release ice.

10. An ice tray grid comprising a plurality of substantially vertically disposed transversely extending separator members, a longitudinal separator member interlocked with the transverse separator members and movable angularly on the transverse separator members, a longitudinally movable bar, cam and locking means between the bar and longitudinal and transverse separator members whereby movement of the bar moves the longitudinal separator member angularly about a horizontal axis and moves each transverse separator member angularly about a vertical axis intermediate the length of each transverse member, and manually operable means to move said bar.

11. An ice tray grid comprising a plurality of transversely extending separator members having apertures formed adjacent their lower edges and spaced compound notched portions formed adjacent their upper edges, a normally vertically disposed longitudinal separator member movably mounted in said apertures and notched portions of the transversely extending separator members and having a plurality of spaced substantially vertically disposed slots for the reception of the transverse members and a plurality of longitudinally spaced cam portions formed adjacent its upper edge, a movable bar positioned in portions of said compound notched portions of the transversely extending separator members, cam portions on the bar engaging the cam portions formed adjacent the upper edge of the longitudinal separator, and manually operable means to move said bar to move the longitudinal separator from a substantially vertical position towards an angular position and to move each transverse separator member about a substantially vertical axis to release ice.

12. An ice tray grid comprising a plurality of relatively movable intersecting longitudinal and transverse separator members, connecting means between the intersecting separator members whereby a plurality of said separator members may be moved about substantially vertical axes intermediate their length and another separator member may be moved about a horizontal axis from a substantially vertical position toward an angular position, and actuating means associated with said separator members whereby said members may be actuated to release ice.

CLIFFORD R. CARNEY.

June 30, 1942.    N. B. COHEN    2,287,974
HEATING APPARATUS
Filed June 16, 1939
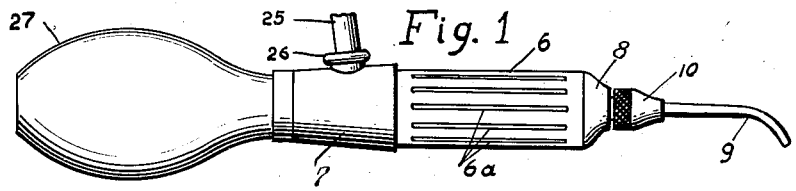
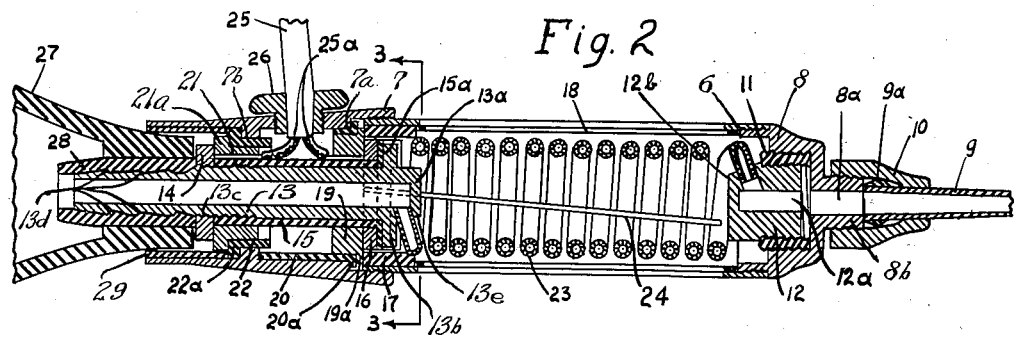
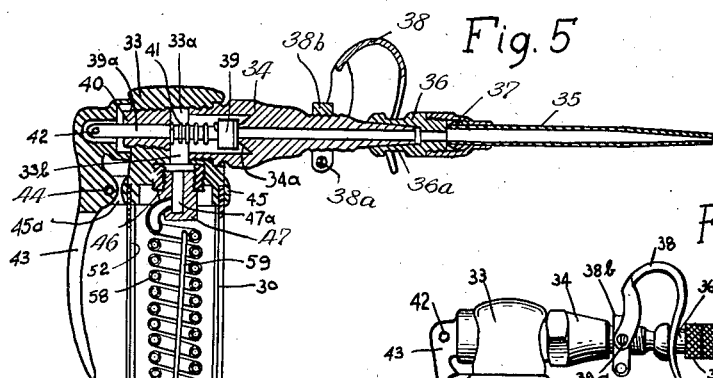
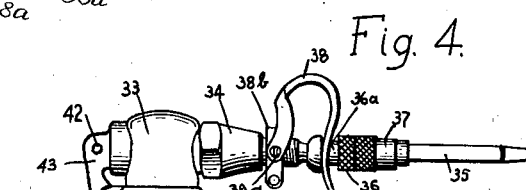
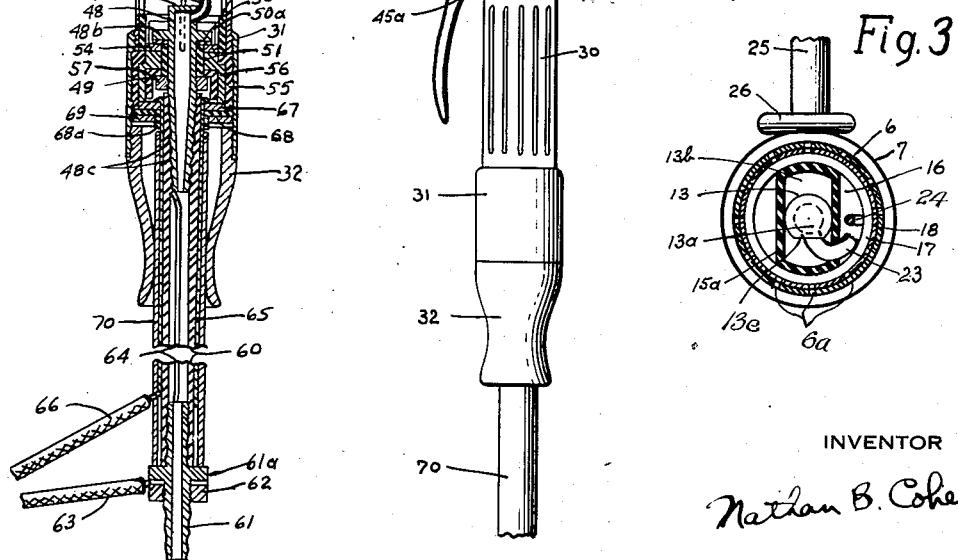
INVENTOR
Nathan B. Cohen